(12) United States Patent
Heuer et al.

(10) Patent No.: US 7,104,614 B2
(45) Date of Patent: Sep. 12, 2006

(54) METHOD AND SYSTEM FOR PREVENTING ROLLOVER OF A VEHICLE TRAIN

(75) Inventors: Bernd Heuer, Nordstemmen (DE); Klaus Plähn, Seelze (DE)

(73) Assignee: WABCO GmbH & Co. OHG, Hannover (DE)

( * ) Notice: Subject to any disclaimer, the term of this patent is extended or adjusted under 35 U.S.C. 154(b) by 0 days.

(21) Appl. No.: 10/792,527

(22) Filed: Mar. 3, 2004

(65) Prior Publication Data

US 2004/0183372 A1  Sep. 23, 2004

(30) Foreign Application Priority Data

Mar. 18, 2003  (DE) .................. 103 11 838

(51) Int. Cl.
*B60T 8/00* (2006.01)

(52) U.S. Cl. ...................... 303/140; 303/146

(58) Field of Classification Search .............. 180/197; 303/3, 7, 140, 146; 701/70–72
See application file for complete search history.

(56) References Cited

U.S. PATENT DOCUMENTS

| 3,967,862 | A | | 7/1976 | Hunter et al. |
| 4,976,330 | A | * | 12/1990 | Matsumoto .................. 180/197 |
| 5,333,940 | A | | 8/1994 | Töpfer |
| 5,370,199 | A | * | 12/1994 | Akuta et al. ................. 180/197 |
| 5,373,447 | A | * | 12/1994 | Howes et al. ................. 701/91 |
| 6,176,555 | B1 | * | 1/2001 | Semsey ......................... 303/7 |
| 6,327,903 | B1 | | 12/2001 | Hecker et al. |
| 6,553,284 | B1 | | 4/2003 | Holst et al. |
| 6,593,849 | B1 | * | 7/2003 | Chubb et al. ................ 340/446 |
| 6,668,225 | B1 | * | 12/2003 | Oh et al. ....................... 701/70 |
| 2001/0037677 | A1 | * | 11/2001 | Holst et al. .................... 73/121 |
| 2002/0107627 | A1 | * | 8/2002 | Funke et al. .................. 701/70 |
| 2004/0119335 | A1 | * | 6/2004 | Szabo et al. ................. 303/147 |
| 2004/0217647 | A1 | * | 11/2004 | Einig et al. .................. 303/146 |
| 2005/0137767 | A1 | * | 6/2005 | Goebels et al. ............... 701/38 |

FOREIGN PATENT DOCUMENTS

| DE | 196 02 879 C1 | 8/1997 |
| DE | 100 17 045 A1 | 10/2001 |
| DE | 101 28 692 A1 | 12/2001 |
| DE | 100 48 036 A1 | 3/2002 |
| DE | 101 33 409 A1 | 1/2003 |
| EP | 1 167 141 A1 | 1/2002 |

* cited by examiner

*Primary Examiner*—Christopher P. Schwartz
(74) *Attorney, Agent, or Firm*—Kramer Levin Naftalis & Frankel LLP

(57) ABSTRACT

A method and system for preventing rollover of a vehicle train comprising a tractor vehicle and a trailer vehicle. A control system is provided in the tractor vehicle which automatically initiates actuation of the braking system of the tractor vehicle and/or of the trailer vehicle if a danger of rollover of the vehicle train is recognized. A data signal from which it is possible to deduce the speed of at least one wheel of the trailer vehicle at the inside of a curve is transmitted from the trailer vehicle to the control system. The control system uses the data signal to recognize the danger of rollover of the vehicle train.

14 Claims, 3 Drawing Sheets

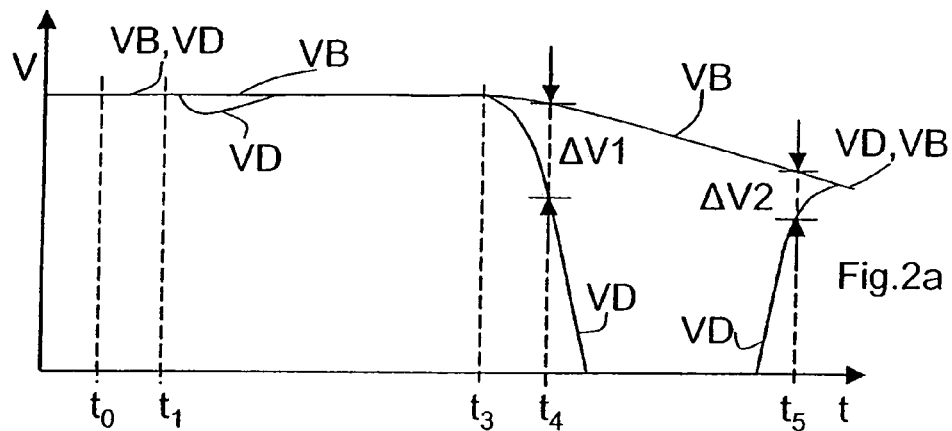
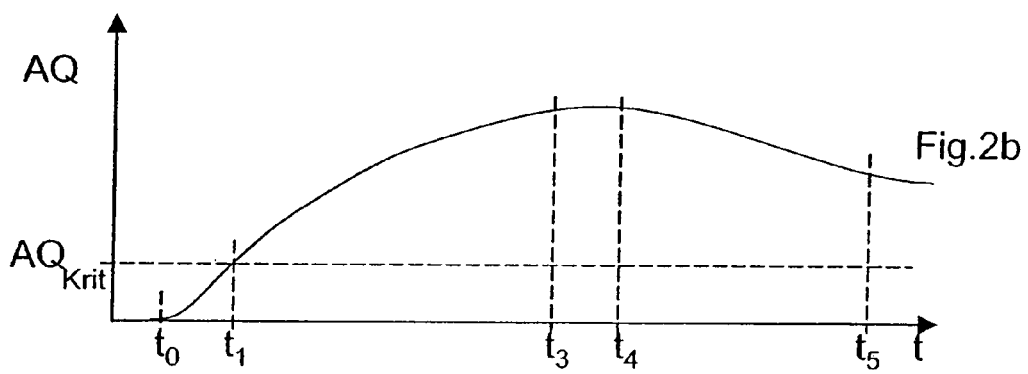
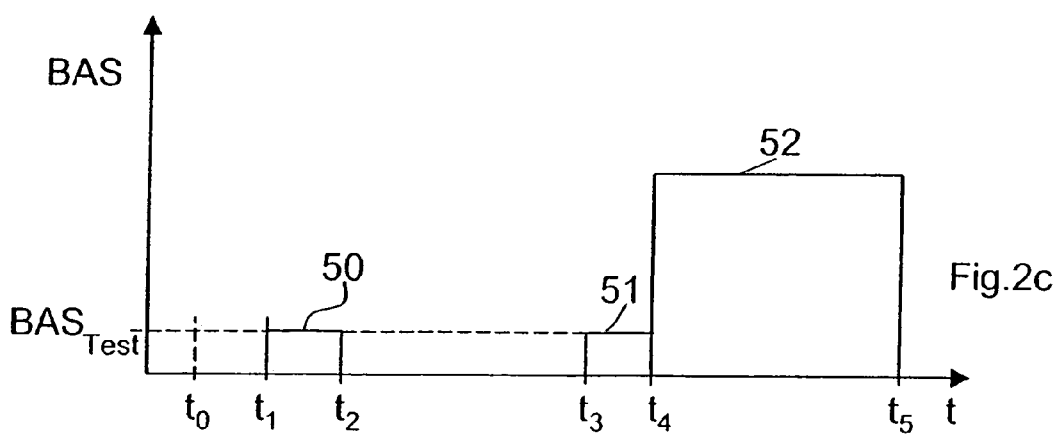

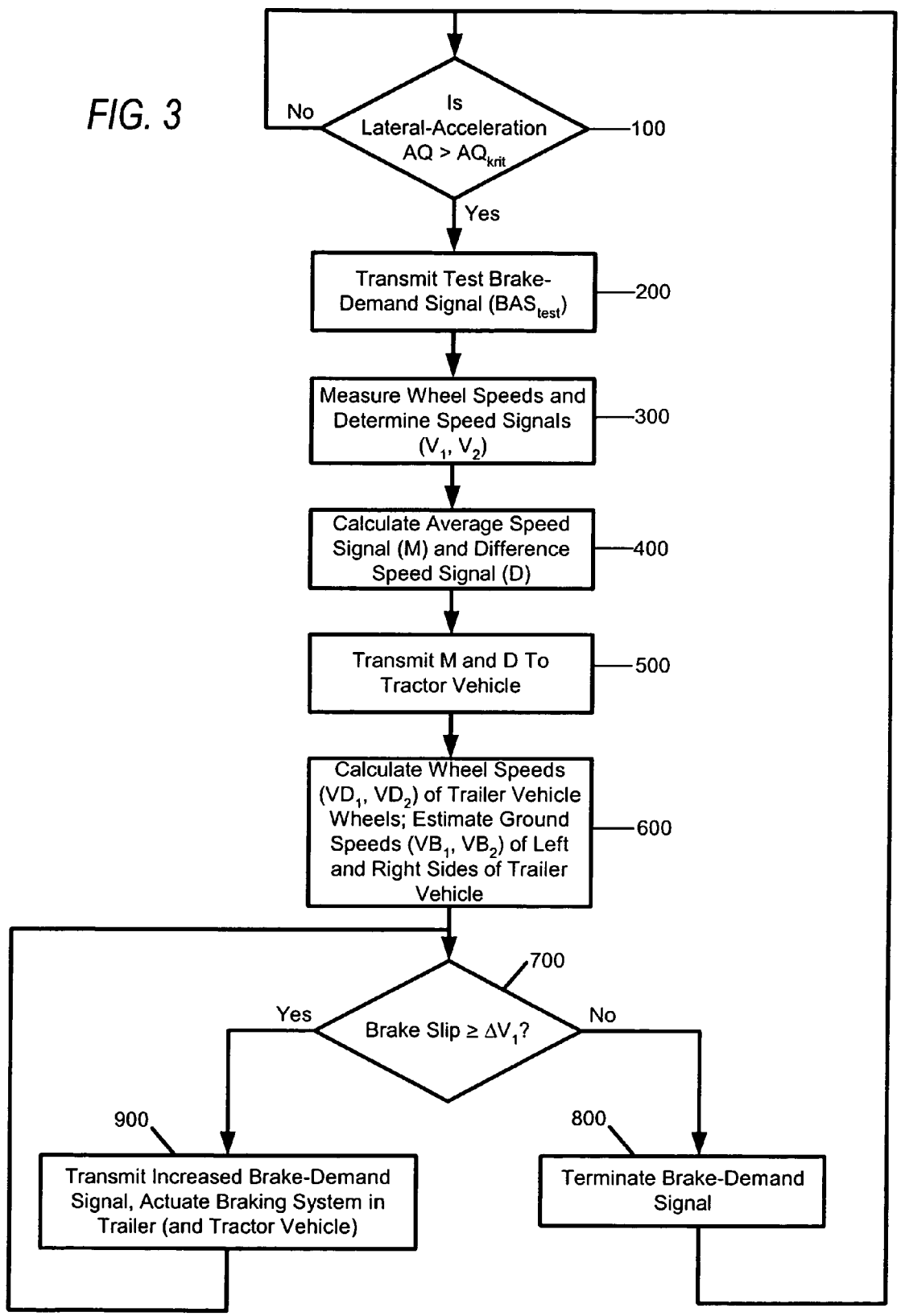

METHOD AND SYSTEM FOR PREVENTING ROLLOVER OF A VEHICLE TRAIN

BACKGROUND OF THE INVENTION

The present invention is directed generally to a method and system for preventing rollover of a vehicle train.

DE 196 02 879 C1 describes a conventional method for preventing vehicle train rollover which involves recognition of the danger of rollover of a vehicle train around its longitudinal axis, especially for an articulated train comprising a tractor and semitrailer. The danger of rollover is detected by lightly actuating the brakes of the semitrailer and observing the reaction of an anti-lock braking system installed in the semitrailer. If the anti-lock braking system responds to the relatively light braking action by initiating a control action to prevent brake lock, this is interpreted as an indication of imminent danger of rollover of the articulated train. In response to the rollover danger, either a warning signal is output or a heavier braking action is performed in order to reduce the lateral acceleration of the articulated train.

According to DE 196 02 879 C1, initiation of an anti-lock braking system control action is detected by measuring the electrical current consumption of the semitrailer anti-lock braking system. For this purpose, a current-measuring instrument is used. This is, however, an expensive and technically complex approach.

Accordingly, for preventing rollover of a vehicle train, it is desired to provide a reliable method and system in which recognition of the danger of rollover can be accomplished by means that are less complex and less expensive relative to conventional methods and systems.

SUMMARY OF THE INVENTION

Generally speaking, in accordance with the present invention, a method and system for preventing rollover of a vehicle train are provided which improve over prior art methods and systems.

The term "brake-demand signal" is used herein as a collective term for the various ways in which the braking system of the trailer vehicle can be actuated from the tractor vehicle. This term should be understood to include all types of information transmission from the tractor vehicle to the trailer vehicle that lead to actuation of the braking system of the trailer vehicle. Examples include a pre-programmed brake-pressure command via a trailer-control valve or the transmission of a brake-actuation value via an electronic data interface.

According to the present invention, variables measured by the trailer vehicle can be used in the control system of the tractor vehicle to recognize the danger of rollover of the vehicle train. For this purpose there is no need to expand the system present in the vehicle train with additional components. Furthermore, an improvement in recognition of the danger of rollover is possible, since it is no longer necessary to wait for an anti-lock braking system control action. Appropriate measures for preventing rollover of the vehicle train can be initiated even before an anti-lock braking system control action, as will be described in greater detail hereinafter.

In an advantageous embodiment of the present invention, trailer vehicle data can be used in accordance with International Organization for Standardization ("ISO") Standard 11992. Thus, compatibility between tractor vehicles and trailer vehicles of different manufacturers is ensured in a simple manner.

Accordingly, it is an object of the present invention to provide an improved method and system for preventing rollover of a vehicle train in which recognition of the danger of rollover can be accomplished by means that are simple and inexpensive relative to conventional methods and systems.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which:

FIGS. 2a-2c are timing diagrams illustrating, respectively, the time variation of speed signals, lateral acceleration and brake-demand signals, in accordance with the present invention; and FIG. 3 is a flow chart showing the process flow of a method for preventing rollover of a vehicle train according to a preferred embodiment of the present invention.

DETAILED DESCRIPTION OF THE PREFERRED EMBODIMENTS

Figure 1:
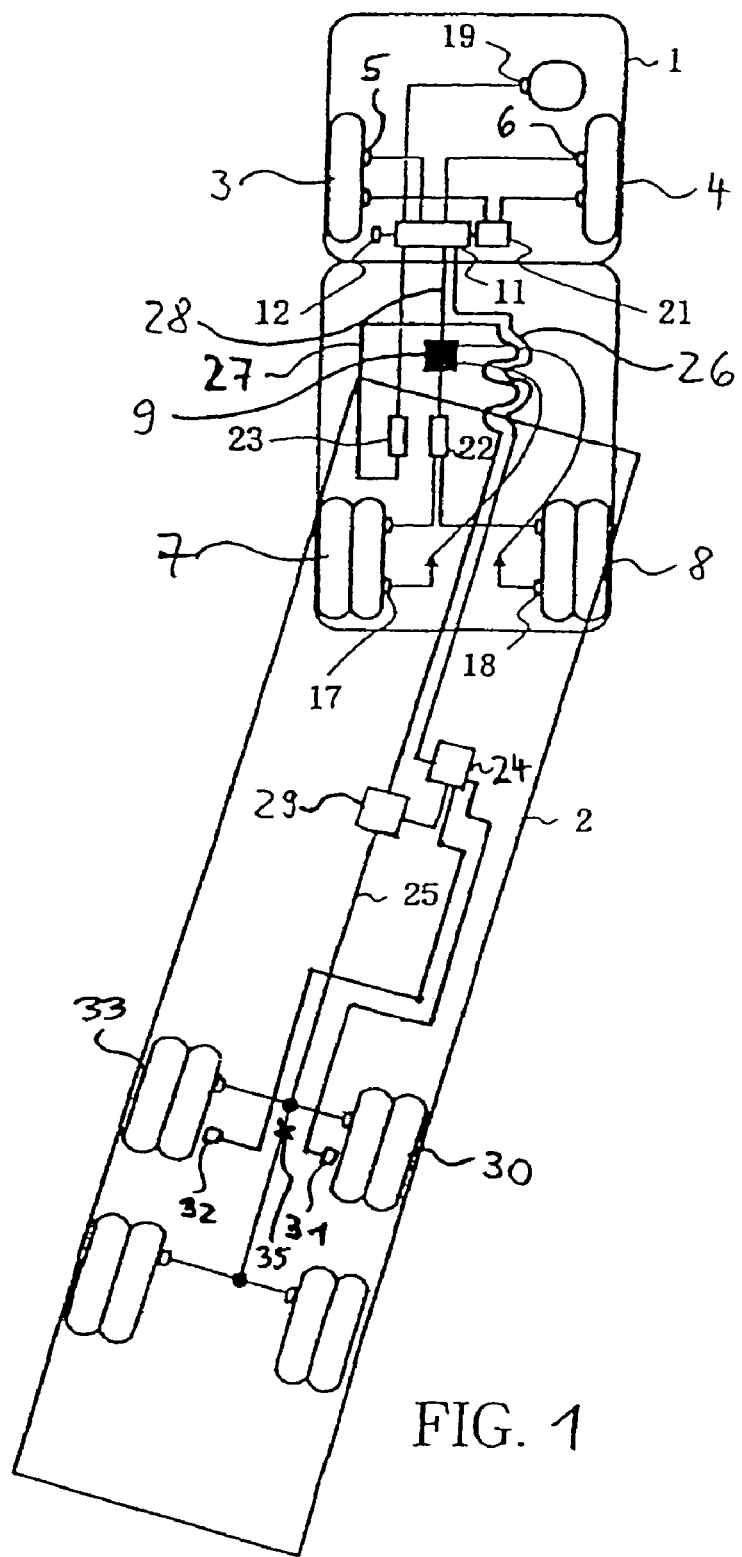
FIG. 1 is a bottom view of a vehicle train according to a preferred embodiment of the present invention.

Referring now to the drawing figures, FIG. 1 shows a vehicle train with a tractor vehicle (1) to which a trailer vehicle (2) is coupled. The tractor vehicle is provided with a steerable front axle, to which wheels (3, 4) are allocated, as well as with a rear axle, to which wheels (7, 8) are allocated. Braking force can be applied to wheels (3, 4, 7, 8) via wheel brakes allocated to the wheels. Hereinafter, it will be assumed that tractor vehicle (1) is equipped with a pressurized-fluid braking system as well as with a control system, such as an electrically controlled braking system (EBS). It should be understood, however, that the present invention can also be used advantageously with other types of braking systems, such as brakes actuated by purely electromechanical means. Furthermore, a vehicle-dynamics control system, which can also be designed as part of the aforesaid control system, can be provided in tractor vehicle (1).

Provided as part of the control system in tractor vehicle (1) is a control device (11), which is used for control of various brake functions on the front axle of tractor vehicle (1). Control device (11) can be designed, for example, as an electronic control unit of an EBS. For this purpose, control device (11) is electrically connected to a valve device (21), by means of which controlled brake pressure can be injected into the wheel brakes of wheels (3, 4). A control module (9) is provided for control of the wheel brakes of wheels (7, 8) allocated to the rear axle. Control module (9) is electrically connected to a further valve device (22) by means of which controlled brake pressure can be injected into the wheel brakes of wheels (7, 8). Control module (9) is connected via a data circuit (28) to control device (11) for the purpose of data exchange.

Control module (9) receives, via electrical circuits, speed signals from speed sensors (17, 18) which are disposed on wheels (7, 8) and by means of which the speeds of rear wheels (7, 8) can be determined. Control device (11) is electrically connected to speed sensors (5, 6), by means of which the speeds of front wheels (3, 4) can be determined. Via data circuit (28), control device (11) receives, from the other control device (9), signals that represent the speeds of rear wheels (7, 8) of tractor vehicle (1).

Furthermore, a steering-angle sensor (19) as well as a lateral-acceleration sensor (12), for example, can be electrically connected to control device (11). By means of lateral acceleration sensor (12), it is possible to detect the lateral acceleration of tractor vehicle (1) by direct measurement. Alternatively, if no lateral acceleration sensor is provided, the lateral acceleration can also be determined from the speeds of wheels (5, 6, 7, 8) by using the method described in DE 100 17 045 A1.

Trailer vehicle (2) is also provided with a braking system that is operated by pressurized fluid and that can be actuated via a brake-pressure line (25). A trailer control valve (23) for control of the braking of trailer vehicle (2) is provided in tractor vehicle (1). By means of trailer control valve (23), brake pressure can be admitted to brake-pressure line (25) via a brake-pressure line (27). Trailer control valve (23) is electrically connected to control device (11). By means of trailer control valve (23), control device (11) can control the brake pressure in trailer vehicle (2), for example, by the fact that the brake-demand signal measured by control device (11) is transformed by appropriate actuation of trailer control valve (23) into a corresponding pressure value.

In the embodiment depicted in FIG. 1, components 5, 6, 9, 11, 12, 17, 18, 19, 21, 22, 23, 28 are part of the control system of tractor vehicle (1).

Furthermore, there is provided in trailer vehicle (2) a device (24), such as, for example, an anti-lock braking system, which provides a wheel-lockup protection function for trailer vehicle (2). Anti-lock braking system (24) is capable, by means of a valve device (29), of modulating the brake pressure fed via brake-pressure line (25) to the trailer vehicle. In other words, it can reduce the brake pressure in the event of a lockup risk. For this purpose anti-lock braking system (24) is electrically connected to speed sensors (31, 32), which are disposed on wheels (30, 33) and by means of which the speeds of wheels (30, 33) can be determined. From the behavior of these speeds, anti-lock braking system (24) can then determine a possible lockup risk.

Anti-lock braking system (24) is connected via an electrical connecting cable (26) to control device (11) in tractor vehicle (1). Electrical connecting cable (26) contains electrical supply conductors as well as a data interface. Via the data interface, anti-lock braking system (24) delivers to control device (11) a series of data signals, such as the mean value (M) of the speeds of wheels (30, 33), the difference value (D) thereof, as well as information on execution of anti-lock control. These and further transmitted data signals are explained in more detail in, for example, ISO Standard 11992 which is incorporated herein by reference.

Control device (11) executes a series of control algorithms, such as brake-lock protection functions for the front axle of tractor vehicle (1), electronic distribution of brake force between the front and rear axles of tractor vehicle (1) and optimization of brake-lining wear between the front and rear axles of tractor vehicle (1). Control device (11) also applies a method for preventing rollover of vehicle train (1, 2) according to the present invention, which method will be explained in greater detail hereinafter with reference to FIGS. 2 and 3.

By means of three timing diagrams, FIG. 2 illustrates the time variations of speed signals (VB, VD) (FIG. 2a), of lateral acceleration (AQ) (FIG. 2b) and of brake-demand signal (BAS) (FIG. 2c). In FIG. 2a there are indicated the time variations of a ground speed (VB) of trailer vehicle (2), calculated by control device (11), and a wheel speed (VD) determined as a result from the data signals received from trailer vehicle (2).

In trailer vehicle (2), the wheel speeds of wheels (30, 33) of the left and right sides of the vehicle are measured by means of speed sensors (31, 32) in anti-lock braking system (24); and anti-lock braking system (24) determines a speed signal ($v_2$) from the signal of sensor (32) and a speed signal ($v_1$) from the signal of sensor (31) (see FIG. 3, step 300). Anti-lock braking system (24) determines an average speed signal (M) from speed signals ($v_1$, $v_2$) as well as a difference speed signal (D), for example by means of the following formulas (see FIG. 3, step 400):

$$M = \frac{v_1 + v_2}{2} \quad [1]$$

$$D = v_1 - v_2 \quad [2]$$

Anti-lock braking system (24) transmits the variables (M, D) calculated in this way via the data interface to tractor vehicle (1) (see FIG. 3, step 500).

In tractor vehicle (1), the average speed (M) and the difference speed (D) are received and further computational steps are performed (see FIG. 3, step 600). In a first computational step, the wheel speeds of individual wheels (30, 33) of trailer vehicle (2) are reconstructed from these variables (M, D), for example by means of the following formulas:

$$VD_1 = M + \frac{D}{2} \quad [3]$$

$$VD_2 = M - \frac{D}{2} \quad [4]$$

The ground speeds ($VB_1$, $VB_2$) of the left and right vehicle sides of trailer vehicle (2) are estimated by control device (11), preferably by using the signals of steering-angle sensor (19) and lateral-acceleration sensor (12) and the wheel-speed signals of sensors (5, 6, 17, 18) of the tractor vehicle in such a way that they represent a measure of the speed, relative to the roadway, of wheels (30, 33) equipped with speed sensors (31, 32). Thus, the ground speeds ($VB_1$, $VB_2$) and the previously measured wheel speeds ($VD_1$, $VD_2$) represent comparable physical variables that can be appropriately used to calculate a difference, for example, for the purpose of determining a measure of the brake slip of trailer vehicle (2).

In this way, ground speeds ($VB_1$, $VB_2$) and wheel speeds ($VD_1$, $VD_2$) are used to monitor brake slip on the respective sides of trailer vehicle (2). The sequence explained hereinafter with reference to FIG. 2a is performed separately for the left and right vehicle sides of trailer vehicle (2). In FIG. 2a, only the variation of the speed signals for the vehicle side at the inside of a curve being negotiated by the vehicle train is illustrated in simplified form with placeholders (VB, VD). The deviation of the graph of wheel speed (VD) from the graph of ground speed (VB) depicted in FIG. 2a therefore represents the aforesaid degree of brake slip of the vehicle side of trailer vehicle (2) at the inside of the curve. On the vehicle side at the outside of the curve, the wheel speed and ground speed vary in a substantially identical manner, meaning that no notable brake slip takes place there.

In the vehicle train as depicted in FIG. 1, wheel (33) is located on the vehicle side of trailer vehicle (2) at the inside of the curve being negotiated by the vehicle train, while wheel (30) is located on the side at the outside of the curve.

As shown in FIG. 3, the lateral acceleration (AQ) of the vehicle train is monitored and compared to a predefined threshold value ($AQ_{krit}$) (step 100).

Referring to FIGS. 2a- 2c and FIG. 3, the vehicle train is first traveling straight ahead, beginning at instant t=0, but then begins to travel on a curve, beginning at instant $t_0$. At that instant, the value of lateral-acceleration signal (AQ) becomes non-zero. At an instant $t_1$, lateral-acceleration signal (AQ) reaches the predefined threshold value ($AQ_{krit}$), which it subsequently exceeds. Control device (11) recognizes this at instant $t_1$ and transmits a test brake-demand signal (50) to trailer vehicle (2), such that the amplitude of the output brake-demand signal (BAS) has the value ($BAS_{r\_est}$) (step 200, FIG. 3). Test brake-demand signal (50) is designed such that a test braking action is initiated in trailer vehicle (2). During this action, the braking system of the trailer vehicle is actuated in such a way that at least one wheel (33) of the trailer vehicle at the inside of the curve is acted on by a brake force smaller than the maximum possible brake force. This can be achieved, for example, because all wheels of the trailer vehicle are acted on by an identical, relatively small brake force. At the wheels of the side of trailer vehicle (2) at the outside of the curve, this does not lead to any perceptible change of wheel-speed behavior, because there the force between wheel and roadway has a relatively normal magnitude. Preferably, the brake force applied during the test braking action has a magnitude that does not lead to any perceptible deceleration of the vehicle train (1, 2). Appropriate values can be determined experimentally, for example.

From FIG. 2a it is evident that the variation of wheel speed (VD) deviates from the variation of ground speed (VB) after the test braking action has been initiated, thus leading to a certain level of brake slip. This brake slip is shown in greatly exaggerated manner in FIG. 2a for the purpose of illustration.

The brake slip is compared to a predefined threshold value ($\Delta V1$) (see FIG. 3, decision 700).

At instant $t_2$ (see FIG. 2c), the test braking action is terminated by canceling test brake-demand signal (50), since control device (11) did not recognize any danger of rollover of the vehicle train on the basis of the observed brake slip (step 800, FIG. 3). Thereupon, the variations of wheel speed (VD) and ground speed (VB) match one another once again.

At an instant $t_3$, another test braking action is initiated in the manner described hereinabove by means of a test brake-demand signal (51), since lateral-acceleration signal (AQ) is still exceeding the predefined value ($AQ_{krit}$) and has even increased compared with instant $t_1$. This suggests that the danger of rollover may have become greater because of increasing lateral acceleration while the curve is still being negotiated. The test braking action initiated at instant $t_3$ in turn causes the variation of wheel speed (VD) to deviate from the variation of ground speed (VB), thus indicating that brake slip is occurring. At instant $t_4$, the brake slip reaches a predefined threshold value ($\Delta V_1$). Control device (11) recognizes this as indicating a danger of rollover of vehicle train (1, 2), and, thereupon, transmits an increased brake-demand signal (52) to trailer vehicle (2) (step 900, FIG. 3). Brake-demand signal (52) causes actuation of the braking system in trailer vehicle (2), with the result that trailer vehicle (2), and thus the entire vehicle train (1, 2), is decelerated. To assist this process, control device (11) can also command actuation of the braking system in tractor vehicle (1). In an advantageous embodiment of the present invention, the braking system in tractor vehicle (1) is always actuated in addition to actuation of the braking system in trailer vehicle (2).

As is evident from FIG. 2a, the ground speed (VB) decreases because of the deceleration of trailer vehicle (1, 2). As the ground speed (VB) decreases, meaning that the travel speed of vehicle train (1, 2) is decreasing on the whole, the lateral acceleration of the vehicle train also decreases, as can be seen in FIG. 2b from the decreasing lateral-acceleration signal (AQ). By virtue of the smaller lateral acceleration, the danger of rollover of the vehicle train is also reduced. In other words, potential rollover of the vehicle train can be prevented by deceleration.

At an instant $t_5$, the brake slip drops below a predefined further threshold value ($\Delta V2$), which is recognized by control device (11) and is assessed as an indication that a danger of rollover of the vehicle train no longer exists. Thereupon, control device (11) ends the braking action by terminating brake-demand signal (52) (step 800, FIG. 3).

Accordingly, the present invention provides a method and system for preventing rollover of a vehicle train in which variables measured by the trailer vehicle are used to recognize the danger of rollover of the vehicle train. If a rollover danger is recognized, then a brake-demand signal is automatically generated.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for preventing rollover of a vehicle train, the vehicle train including a tractor vehicle and a trailer vehicle, the tractor and trailer vehicles having wheels, the tractor vehicle having a tractor vehicle braking system, the trailer vehicle having a trailer vehicle braking system, the tractor vehicle further having a control system arranged and constructed to automatically actuate at least one of the tractor vehicle braking system and the trailer vehicle braking system when a vehicle train rollover danger is present, the method comprising the steps of receiving in said control system at least one data signal from said trailer vehicle and at least one other data signal from said tractor vehicle, said at least one data signal forming a basis for determining wheel speed of at least one wheel of said trailer vehicle disposed on a side of said trailer vehicle at the inside of a curve when said vehicle train is negotiating said curve and said at least one other data signal forming a basis for determining ground speed of said side of said trailer vehicle, and ascertaining whether a vehicle train rollover danger exists based on said wheel speed and said ground speed, wherein said at least one data signal includes at least one of (i) an average value of a speed of a wheel on a left side of said trailer vehicle and a speed of a wheel on the right side of said trailer vehicle, and (ii) a difference value of said speeds, and wherein said at least one other data signal includes at least one of a lateral acceleration value, a wheel speed and a steering angle value of said tractor vehicle.

2. The method of claim 1, further comprising the steps of actuating said trailer vehicle braking system and, based at least in part on at least one of ground speed and wheel speed of said tractor vehicle, measuring brake slip on said at least one wheel of said trailer vehicle disposed on said side of said trailer vehicle at the inside of said curve.

3. The method of claim 2, wherein a vehicle train rollover danger is recognized when said brake slip reaches a predefined threshold value.

4. The method of claim 1, wherein said at least one data signal from said trailer vehicle includes an average value of wheel speeds of at least two of said wheels of said trailer vehicle and a difference value of wheel speeds of said at least two of said wheels of said trailer vehicle.

5. The method of claim 1, wherein said at least one data signal from said trailer vehicle is evaluated in accordance with ISO Standard 11992.

6. The method of claim 1, further comprising the step of transmitting a test brake-demand signal to said trailer vehicle braking system from said control system and initiating a test braking action to actuate said trailer vehicle braking system such that said at least one wheel of said trailer vehicle disposed on a side of said trailer vehicle at the inside of said curve is acted on by a brake force smaller than a maximum brake force.

7. The method of claim 6, further comprising the step of determining lateral acceleration of said vehicle train, and wherein said step of transmitting said test brake-demand signal to said trailer vehicle braking system occurs when said lateral acceleration reaches a predefined value.

8. A system for preventing rollover of a vehicle train, the vehicle train including a tractor vehicle and a trailer vehicle, the tractor and trailer vehicles having wheels, the tractor vehicle including a tractor vehicle braking system, the trailer vehicle including a trailer vehicle braking system, the system comprising control means associated with the tractor vehicle arranged and constructed to automatically actuate at least one of the tractor vehicle braking system and the trailer vehicle braking system when a vehicle train rollover danger is present, means for receiving in said control means at least one data signal from said trailer vehicle and at least one other data signal from said tractor vehicle, said at least one data signal forming a basis for determining wheel speed of at least one wheel of said trailer vehicle disposed on a side of said trailer vehicle at the inside of a curve when said vehicle train is negotiating said curve and said at least one other data signal forming a basis for determining ground speed of said side of said trailer vehicle, and means for ascertaining whether a vehicle train rollover danger exists based on said wheel speed and said ground speed wherein said at least one data signal includes at least one of (i) an average value of a speed of a wheel on a left side of said trailer vehicle and a speed of a wheel on the right side of said trailer vehicle, and (ii) a difference value of said speeds, and wherein said at least one other data signal includes at least one of a lateral acceleration value, a wheel speed and a steering angle value of said tractor vehicle.

9. The system of claim 8, further comprising means for actuating said trailer vehicle braking system, and means for measuring brake slip on said at least one wheel of said trailer vehicle disposed on said side of said trailer vehicle at the inside of said curve based at least in part on at least one of ground speed and wheel speed of said tractor vehicle.

10. The system of claim 9, wherein a vehicle train rollover danger is recognized when said brake slip reaches a predefined threshold value.

11. The system of claim 8, wherein said at least one data signal from said trailer vehicle includes an average value of wheel speeds of at least two of said wheels of said trailer vehicle and a difference value of wheel speeds of said at least two of said wheels of said trailer vehicle.

12. The system of claim 8, wherein said at least one data signal from said trailer vehicle is evaluated in accordance with ISO Standard 11992.

13. The system of claim 8, further comprising means associated with said control means for transmitting a test brake-demand signal to said trailer vehicle braking system, and means for initiating a test braking action to actuate said trailer vehicle braking system such that said at least one wheel of said trailer vehicle disposed on a side of said trailer vehicle at the inside of said curve is acted on by a brake force smaller than a maximum brake force.

14. The system of claim 13, further comprising means for determining lateral acceleration of said vehicle train, and means for transmitting said test brake- demand signal to said trailer vehicle braking system when said lateral acceleration reaches a predefined value.

* * * * *